United States Patent [19]
Mainini et al.

[11] Patent Number: 5,927,233
[45] Date of Patent: Jul. 27, 1999

[54] BARK CONTROL SYSTEM FOR PET DOGS

[75] Inventors: Christopher E. Mainini, Knoxville; Albert L. Lee, IV, Maryville, both of Tenn.

[73] Assignee: Radio Systems Corporation, Knoxville, Tenn.

[21] Appl. No.: 09/040,487

[22] Filed: Mar. 10, 1998

[51] Int. Cl.$^6$ ............................................. A01K 15/00
[52] U.S. Cl. ............................................. 119/718
[58] Field of Search ................... 119/718–721, 908, 119/174, 905; 340/573

[56] References Cited

U.S. PATENT DOCUMENTS

| | | | |
|---|---|---|---|
| 4,180,013 | 12/1979 | Smith | 119/29 |
| 4,947,795 | 8/1990 | Farkas | 119/29 |
| 5,061,918 | 10/1991 | Hunter | 119/29 |
| 5,601,054 | 2/1997 | So | 119/718 |
| 5,749,324 | 5/1998 | Moore | 119/719 |

*Primary Examiner*—Thomas Price
*Attorney, Agent, or Firm*—Pitts & Brittian, P.C.

[57] ABSTRACT

A bark control system for training a pet dog not to bark. The bark control system includes a vibration sensor and a microphone either operating independently or in tandem with the vibration sensor gating the microphone. The output of the vibration sensor and the microphone are processed to discriminate the target dog's bark from other noises. When the discrimination result indicates that the sound is a bark, a stimulus delivery device applies a corrective stimulus. To improve bark discrimination, a memory device stores an exemplary bark for comparison. Each bark sampled replaces the bark previously stored permitting the bark control system to adapt to any repetitive bark sequence of the target dog. Finally, a stimulus intensity selection circuit provides variable intensity corrective stimulus.

20 Claims, 5 Drawing Sheets

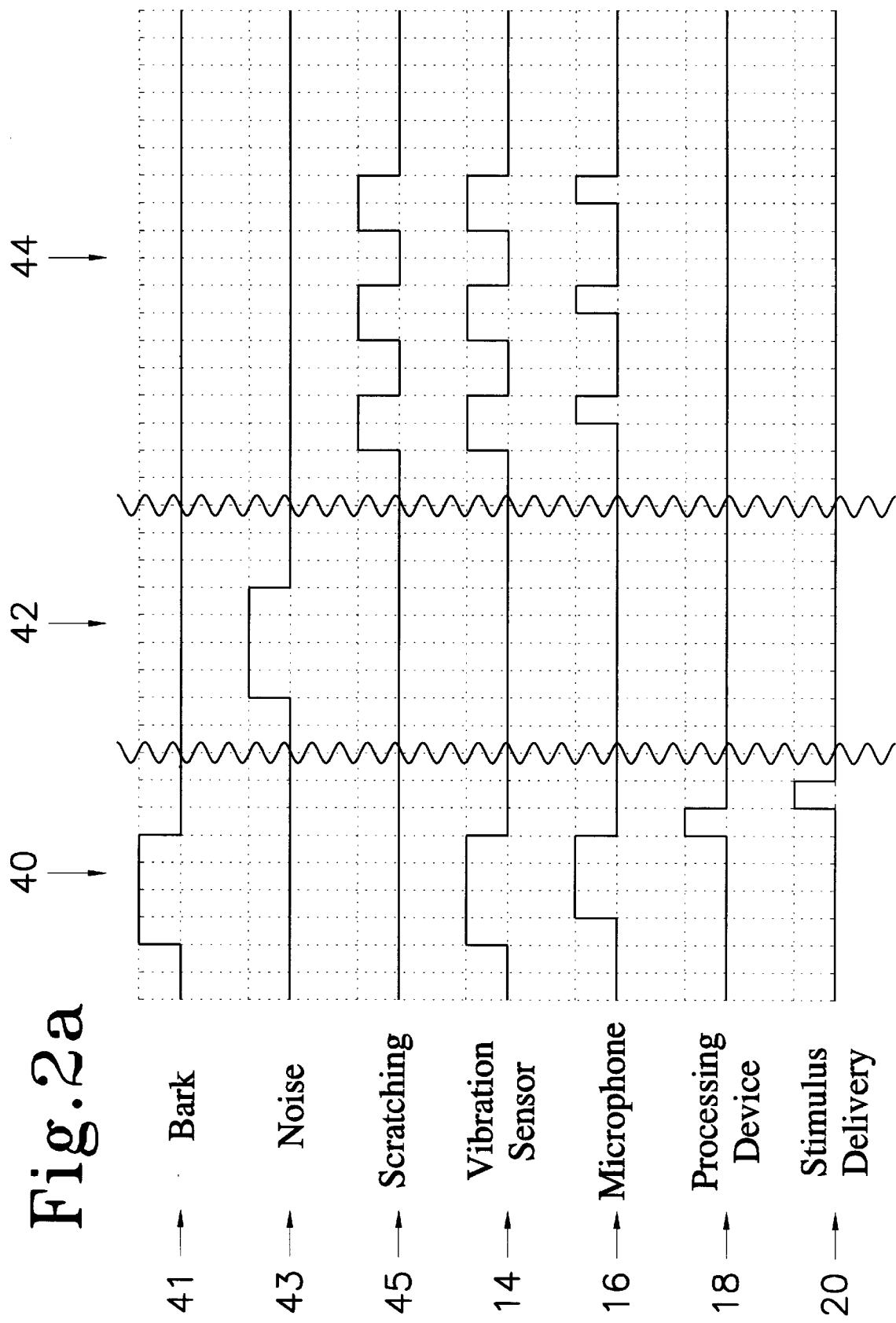

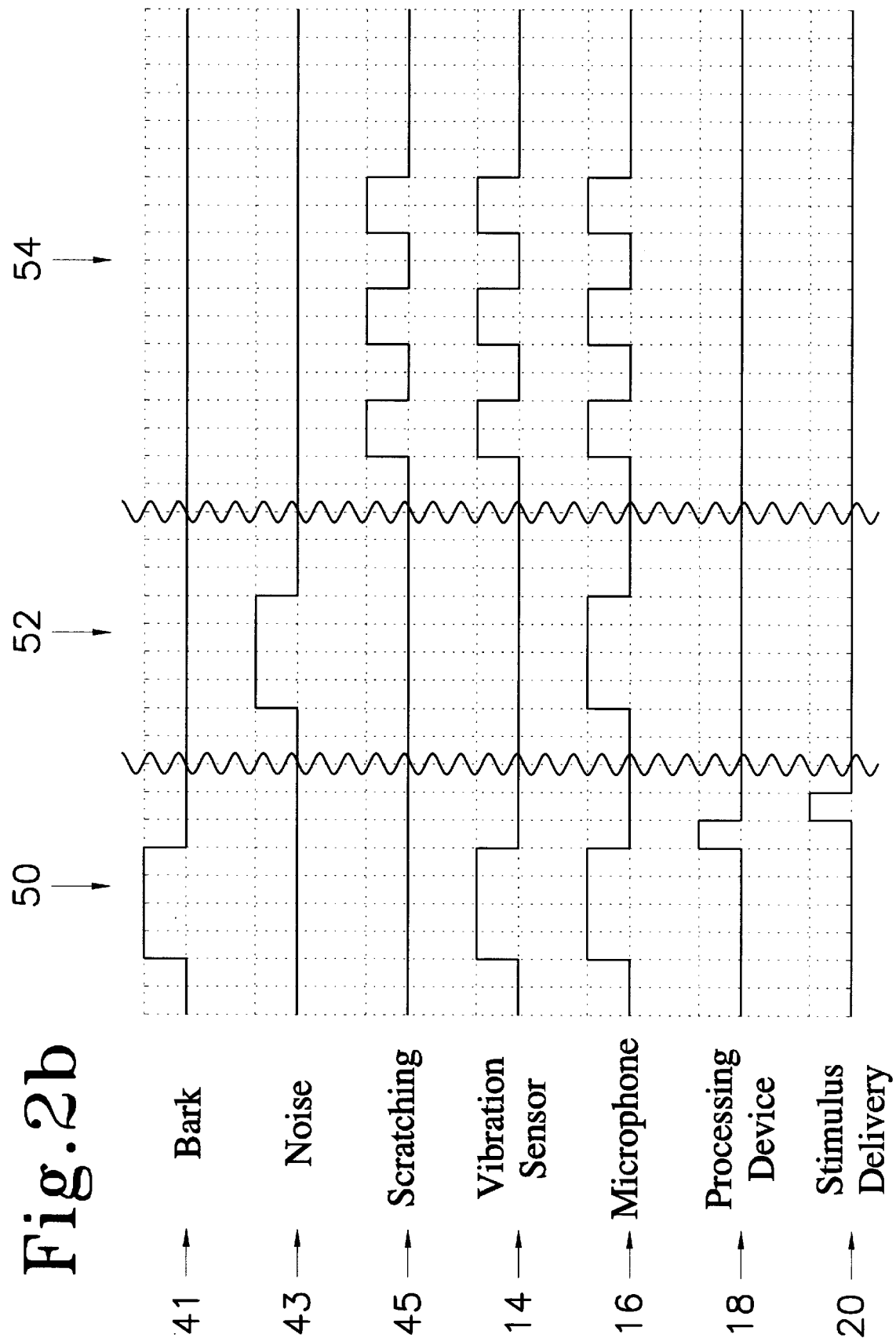

BARK CONTROL SYSTEM FOR PET DOGS

TECHNICAL FIELD

This invention relates to the field of systems for controlling the barking of pet dogs. More specifically, the present invention relates to devices which distinguish the barking of a particular pet dog from other noises made by the particular pet dog, the sounds made by other animals, and other extrinsic noises.

BACKGROUND ART

Most pet owners know the problems associated with controlling the barking of a pet dog. Dogs naturally bark for many reasons such as to signal other dogs, to define their territory, to communicate excitement or fear, and to warn prior to an attack.

Where dogs are kept on large tracts of land, such as farms, the barking of a dog is generally not considered a nuisance. Instead, it may be regarded as a signal of an event requiring the attention of the land owner, for example, a person approaching or a strange animal in the area. However, where a dog owner lives in an area closely proximate to other people, the barking of a dog can become a nuisance to both the dog owner and the neighbors.

Various techniques have been developed to control the barking of a dog. First, the bark of a dog can be controlled surgically by the removal of the larynx. However, this solution is usually unacceptable to the pet owner as unnecessarily cruel and expensive.

Second, standard obedience techniques can be used to train the dog to not bark, but this is time consuming and often requires the presence of the owner to correct the dog. If the owner is absent from the home for long periods of time, such as at work, the dog may learn to not bark only when the owner is present, remaining a nuisance while the owner is away.

Third, a muzzle can be utilized to prevent the dog from barking. However, the muzzle must be periodically removed to allow the dog to eat or drink. While unmuzzled, the dog is not constrained from barking. The need for supervision prevents use of a muzzle for extended periods of time. Further, the intermittent bark control associated with the periodic removal of the muzzle, necessitated by feeding, provides opportunity for the barking to present a nuisance.

Finally, remote and automatic systems using various trigger mechanisms have been developed to control the barking of a dog. There are three main classifications of systems, differentiated by the input devices and signal processing techniques: the microphone input class, the piezoelectric input class, and the bark comparator class.

Systems utilizing a microphone input are typically the most reliable for discriminating between a bark sound and other false signals. However, to maintain this reliability, the microphone must be kept clear of debris. Additionally, microphone input systems are typically larger, more expensive, and use more power than other systems. Furthermore, microphone input systems are less weather resistant than other systems. Because these systems rely on sound volume, sounds from other animals and environment noises may inadvertently trigger the system.

Piezoelectric input systems are triggered by vibration and are smaller, cheaper, and use less power than other systems. However, the lack of sensitivity in the piezoelectric input results in a high false trigger rate and a low repeatability rate. Receiving a corrective signal as a result of a false trigger confuses the dog and hampers effective training.

Presently available bark comparator systems implement one of the above mentioned input devices coupled with a discrimination circuit which compares a previously recorded bark with the new sound. Accordingly, presently available bark comparator systems suffer from difficulty in getting a good sample for comparison and are not consistent in the application of the discrimination solution. Furthermore, dogs tend to have different barks for different occasions which makes meaningful comparison against the stored sample difficult.

The prior art lacks a system for controlling the barking of a pet dog which can be used at all times of the day, without the need for human monitoring. Further, none of the prior art devices filter extraneous noises and only apply a corrective stimulus when the particular dog barks in such a way as to trigger the system.

Therefore, it is an object of the present invention to provide a system for controlling the barking of a pet dog.

It is another object of the present invention to provide such a system capable of continuous monitoring without requiring frequent human intervention.

It is a further object of the present invention to provide such a system tailored to a specific dog and capable of filtering out extraneous noises such that the system is only triggered by a specified bark made by the target dog.

It is yet another object of the present invention to provide such a system that provides a corrective stimulus only to the barks of the target dog meeting specified criteria, thereby training the target dog not to bark.

DISCLOSURE OF THE INVENTION

Other objects and advantages will be accomplished by the present invention which provides for a system controlling the barking of a particular pet dog.

A vibration sensor detects vibrations when the target dog makes a sound while a microphone operates to sample ambient sounds. The output of both the vibration sensor and the microphone are amplified and passed to a processing unit. The processing device processes the sound sampled by the microphone in conjunction with the signal detected by the vibration sensor to discriminate the target dog's bark from other noises. When the discrimination result indicates that the vibration is caused by the dog and that the sound is a bark, a stimulus delivery device applies a corrective stimulus.

In the preferred embodiment, the vibration sensor operates as a gating device for the microphone. When vibrations are sensed by the vibration sensor, the microphone is activated for sampling the sound made by the target dog.

Further, in the preferred embodiment, a memory device is included in the bark control system to store an exemplary bark for comparison. When the discrimination result indicates the sound is a bark, the processing unit compares a bark sample previously stored in the memory device with the contemporaneous bark sample. Should the comparison of the stored bark sample and the contemporaneous bark sample indicate a match, the stimulus delivery device applies a corrective stimulus and the contemporaneous bark sample is then stored in the memory device, replacing the previously stored sample. By comparing each contemporaneous bark with the prior bark, the bark control system can adapt to and respond to any repetitive bark sequence of the target dog, and only the target dog.

Finally, in the preferred embodiment, the bark control system includes a stimulus intensity selection circuit for providing a variable intensity corrective stimulus.

The bark control system is disposed within an enclosure to be worn by the target dog. Depending upon the corrective stimulus used, various modifications to the enclosure can be made including, but not limited to, terminal posts for transferring an electrostatic shock, a speaker opening for broadcasting an audible deterrent or an ultrasonic pulse, a vibration, or a filler valve and spray nozzle for applying an irritant.

BRIEF DESCRIPTION OF THE DRAWINGS

The above mentioned features of the invention will become more clearly understood from the following detailed description of the invention read together with the drawings in which:

FIG. 2a is a timing diagram illustrating the operation of the bark control system where the vibration sensor serves to gate the microphone;

FIG. 2b is a timing diagram illustrating the operation of the bark control system where the vibration sensor and the microphone operate independently and continuously;

BEST MODE FOR CARRYING OUT THE INVENTION

A bark control system for pet dogs incorporating various features of the present invention is illustrated generally at 10 in the figures. The bark control system 10 is designed for training the target dog 12 not to bark. Moreover, in the preferred embodiment the bark control system 10 is designed to distinguish between a specific bark of the target dog 12 and other noises made by the target dog 12 or from other sources.

Figure 1:
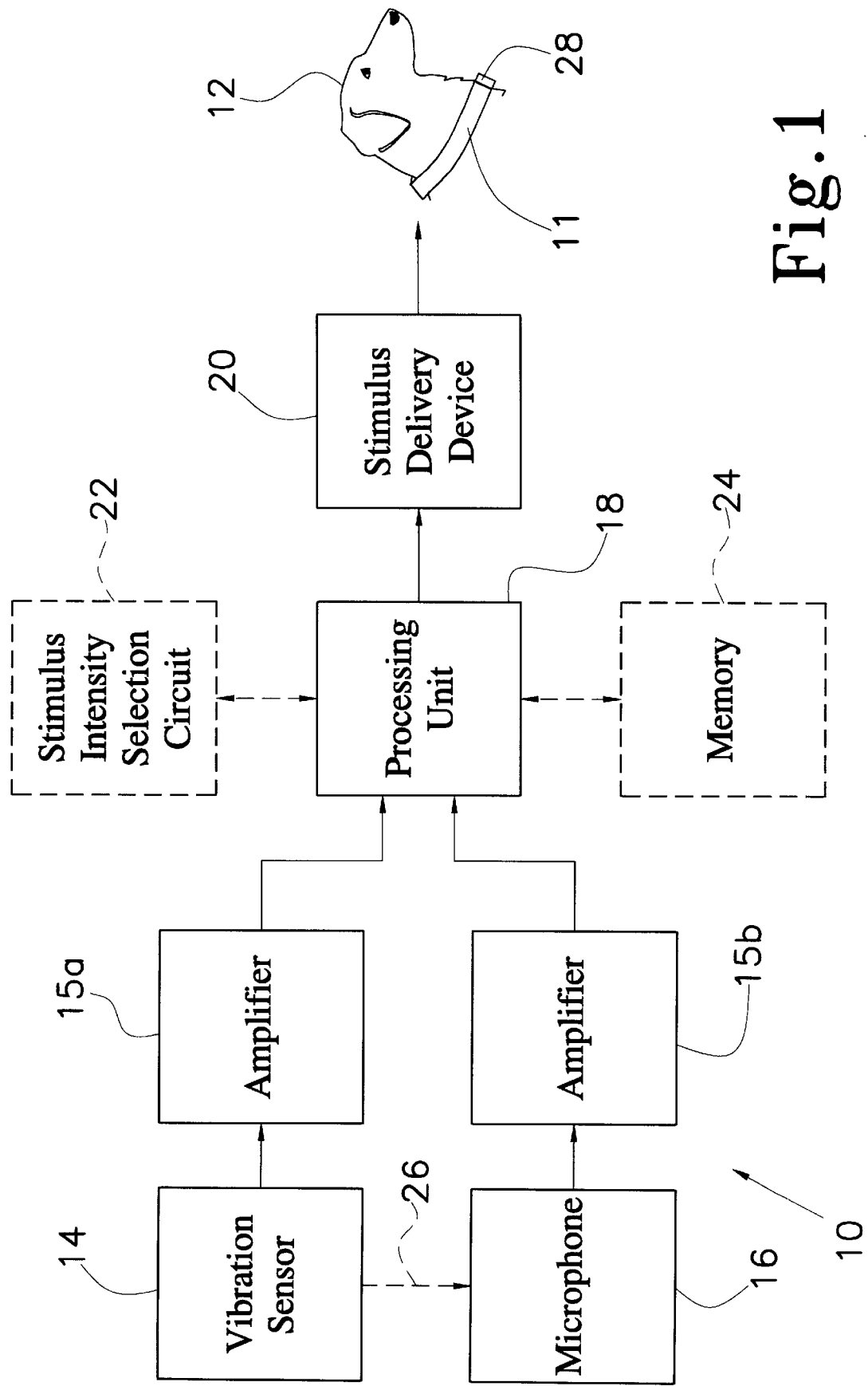
FIG. 1 is a block diagram of the bark control system constructed in accordance with several features of the present invention showing an optional memory device and an optional stimulus intensity selection circuit.

FIG. 1 illustrates a block diagram of the bark control system 10. A vibration sensor 14 detects vibrations when the target dog 12 makes a sound. In the illustrated embodiment, the vibration sensor 14 is a piezoelectric device in contact with the throat of the target dog 12. Simultaneously, a microphone 16 operates to sample contemporaneous ambient sounds. The output of both the vibration sensor 14 and the microphone 16 are amplified by amplifiers 15a and 15b, respectively, and otherwise conditioned before being passed to a processing unit 18. The processing device 18 transforms the contemporaneous sample into vectors and compares those vectors against exemplary vectors representing a typical bark. If the contemporaneous vectors correspond to the exemplary vectors within predetermined tolerances, in conjunction with the signal detected by the vibration sensor 14, the processing device 18 generates a positive discrimination result indicating that the sound is a bark. Upon receipt of a positive discrimination result, a stimulus delivery device 20 applies a corrective stimulus. One skilled in the art will recognize that other types of corrective stimuli could be used such as an electrostatic shock, an ultrasonic pulse, or a vibration, an audible deterrent, or an irritant to the target dog 12.

In the preferred embodiment, the vibration sensor 14 operates as a gating device for the microphone 16, as represented by connection 26. When vibrations are sensed by the vibration sensor 14, the microphone 16 is activated for sampling the sound made by the target dog 12. By activating the microphone 16 only when vibrations are sensed, two functions are accomplished. First, false triggers are dramatically reduced and the bark correction is greatly improved. Second, power usage is reduced corresponding to the minimal activation of the microphone 16.

While an isolated bark may not be considered a nuisance, the pet owner may wish to discourage a bark sequence. Accordingly, a memory device 24 is included in the bark control system 10 of the preferred embodiment to store an exemplary bark for comparison. As previously described, when the vibration sensor 14 detects a vibration indicating that the target dog 12 is making a sound, the microphone 16 is activated to sample the sound. The processing unit 18 discriminates between a bark sound and other sounds made by the target dog 12. When the discrimination result indicates the sound is a bark, the processing unit 18 compares a bark sample previously stored in the memory device 24 with the contemporaneous bark sample. Should the comparison of the stored bark sample and the contemporaneous bark sample indicate a match, the stimulus delivery device 20 applies a corrective stimulus. However, if the contemporaneous bark is not the same as the stored bark, the stored bark is replaced with the contemporaneous bark sample in the memory device 24. By comparing each contemporaneous bark with the prior bark, the bark control system 10 can adapt to respond to any repetitive bark sequence of the target dog 12.

One skilled in the art will recognize that any of the decision making circuitry components are useful in any one or a combination of several various ways including discrete logic, any of various integrated circuit logic types, or by use of a microprocessor, primarily limited by the size of the enclosure (not shown). Finally, in the preferred embodiment, the bark control system 10 includes a stimulus intensity selection circuit 22 for providing a variable intensity corrective stimulus.

FIG. 2a is a timing diagram illustrating the operation of the bark control system 10 in response to various external stimuli, where the vibration sensor 14 operates as a gate for the microphone 16. Timing sequence 40 shows the response of the bark control system 10 when the target dog 12 barks. The vibration sensor 14 detects the vibration of bark 41 and activates the processing device 18. The processing device 18 then takes measurements from both the vibration sensor 14 and the microphone 16. The processing device 18 identifies the sound and vibration as resulting from a bark 41 and signals the stimulus delivery system 20 to apply a corrective stimulus.

Timing sequence 42 shows the response of the bark control system 10 to an ambient noise 43, such as when another dog barks. Because the vibration sensor 14 does not detect a vibration, the microphone 16 is not activated and no corrective stimulus is applied.

Timing sequence 44 shows the response of the bark control system 10 when the target dog 12 is making a sound which is not a bark 45, such as scratching itself or a door and banging the bark control system 10 against a food bowl while eating. The vibration sensor 14 detects the vibration caused by these normal activities and activates the microphone 16. However, the processing device 18 does not recognize the sound 45 as a bark and does not request a corrective stimulus to be applied.

Similarly, FIG. 2b is a timing diagram illustrating the operation of the bark control system 10 in response to various external stimuli, where the vibration sensor 14 and the microphone 16 operate independently and continuously. Timing sequence 50 shows the response of the bark control system 10 when the target dog 12 barks. The vibration sensor 14 detects the vibration of bark 41 while the microphone 16 samples the bark 41. The processing device 18 identifies the sound and vibration as resulting from a bark 41 and signals the stimulus delivery system 20 to apply a corrective stimulus.

Timing sequence 52 shows the response of the bark control system 10 to an ambient noise 43, such as when another dog barks. While the vibration sensor 14 does not detect a vibration, the microphone 16 samples the noise 43. However, because no vibration is detected indicating that the noise 43 did not originate from the target dog 12, no corrective stimulus is applied.

Timing sequence 54 shows the response of the bark control system 10 when the target dog 12 is making a sound 45 which is not a bark, such as scratching a door. The vibration sensor 14 detects the vibration caused by the scratching activity, while the microphone 16 samples the ambient sound 45. However, the processing device 18 does not recognize the sound 45 as a bark and does not request a corrective stimulus to be applied.

Figure 3A:
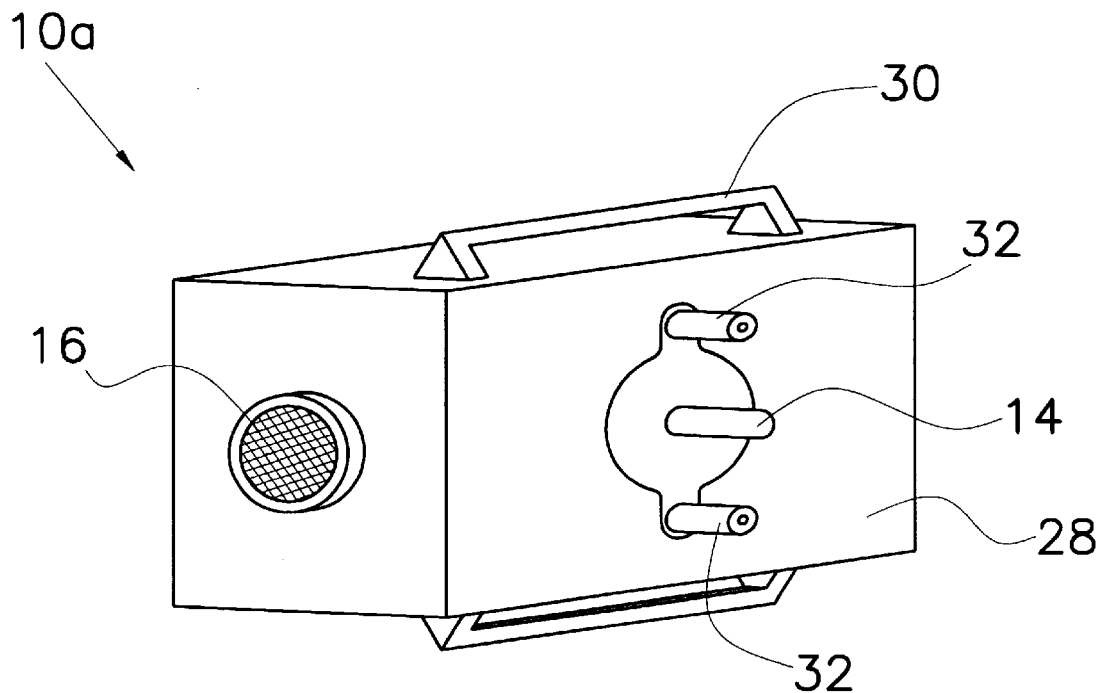
FIG. 3a illustrates a perspective view of the bark control system configured to deliver a corrective stimulus consisting of an electrostatic shock.

FIG. 3a illustrates the bark control system 10a configured to apply an electrostatic shock. An enclosure 28 houses the bark control system 10. At least one mounting device 30 secures the enclosure 28 to the target dog 12. In the illustrated embodiment, the mounting device 30 defines at least one slot for receiving a collar 11 (illustrated in FIG. 1). One skilled in the art will recognize that other mounting devices can be used. Externally visible are the vibration sensor 14, the microphone 16, and the terminal posts 32 for transferring the electrostatic shock corrective stimulus to the target dog 12.

Figure 3B:
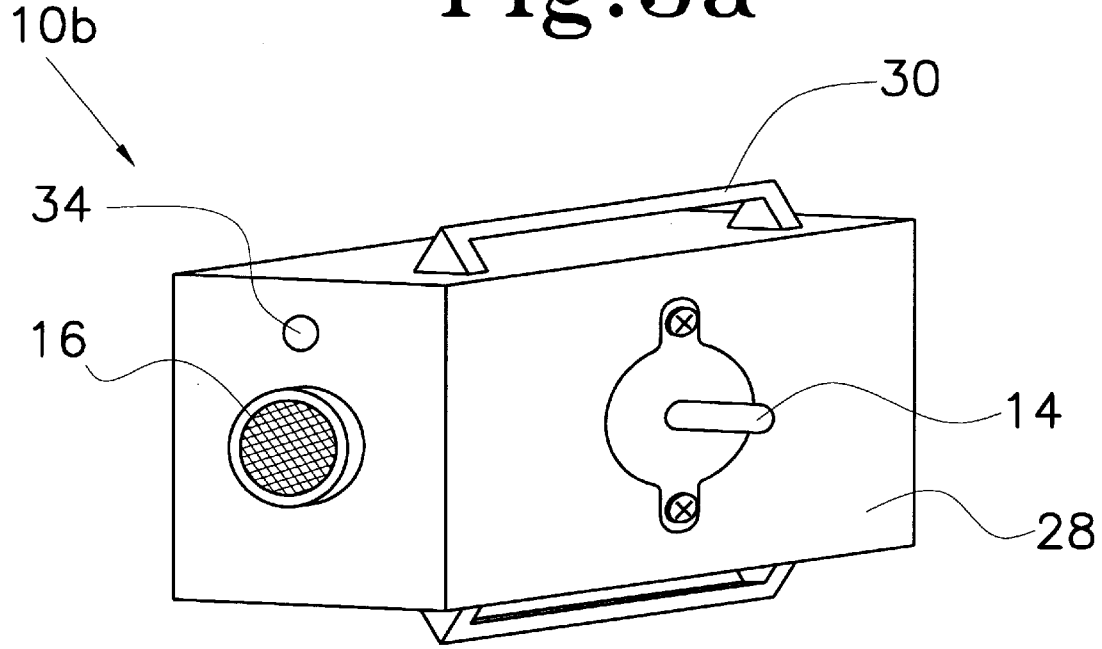
FIG. 3b illustrates a perspective view of the bark control system configured to deliver a corrective stimulus consisting of an ultrasonic pulse or audible deterrent.
Figure 3C:
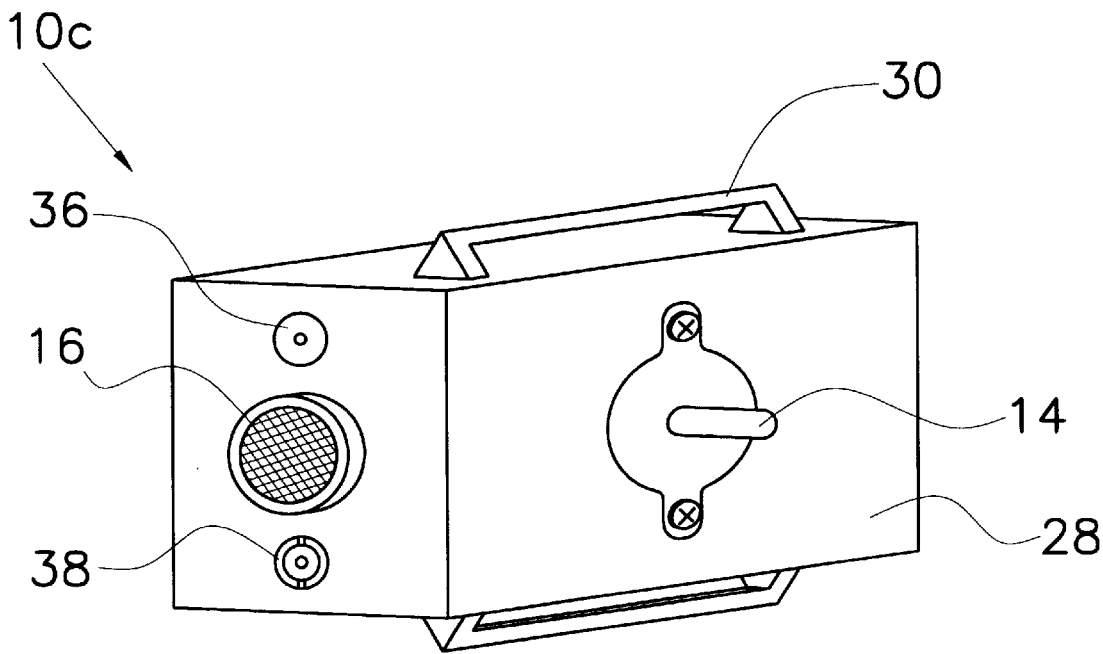
FIG. 3c illustrates a perspective view of the bark control system configured to deliver a corrective stimulus consisting of an irritant.
Figure 3D:
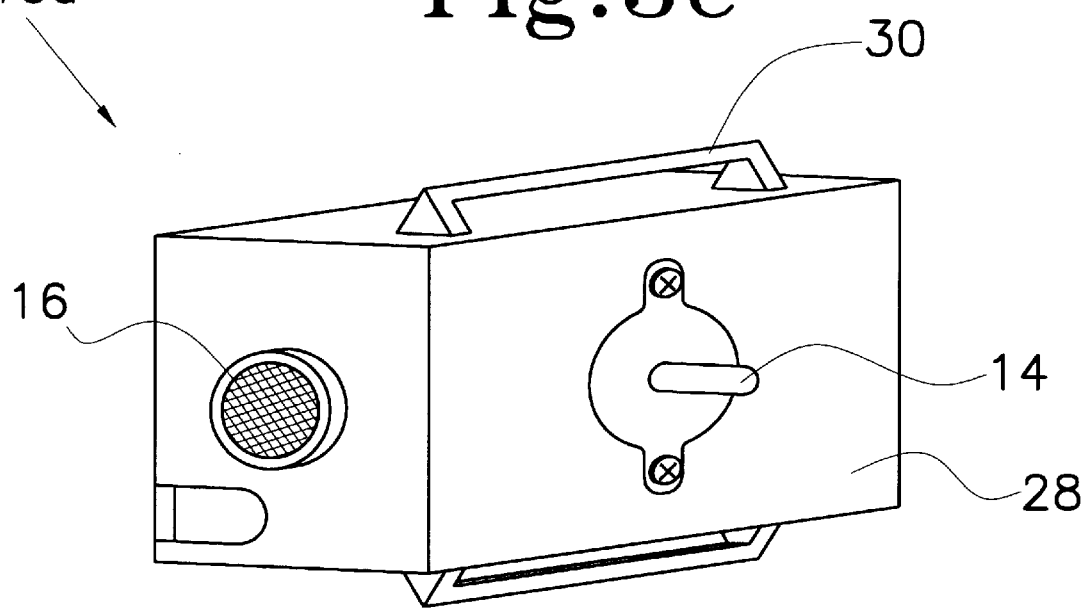
FIG. 3d illustrates a perspective view of the bark control system configured to deliver a corrective stimulus consisting of a vibration.

Other embodiments are illustrated in the other figures. FIG. 3b illustrates the bark control system 10b configured to apply an audible deterrent or an ultrasonic pulse through speaker opening 34. FIG. 3c illustrates the bark control system 10c configured to apply an irritant, such as citronella, to the target dog 12. A filler valve 36 provides access to an irritant reserve tank (not shown) and spray nozzle 38 disperses the irritant to the target dog 12. Finally, FIG. 3d illustrates the bark control system 10d housing a conventional vibrator configured to apply a vibration as a corrective stimulus.

From the foregoing description, it will be recognized by those skilled in the art that a bark control system for pet dogs offering advantages over the prior art has been provided. Specifically, the bark control system provides a device for effectively training a target dog not to bark by applying a negative reinforcement only to sounds produced by the target dog which have sufficient magnitude and are sufficiently similar to the learned sound. Further, the bark control system provides for continuous monitoring of the target dog without the need for frequent human intervention.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A bark control system for training a target dog not to bark, said bark control system comprising:
    an enclosure;
    a mounting device for attaching said enclosure to a target dog;
    a vibration sensor carried by said enclosure for detecting a vibration emitted by the target dog, said vibration sensor operating continuously;
    a microphone carried by said enclosure for sampling an ambient sound;
    a processing device carried by said enclosure for generating an identification result indicating whether said vibration detected by said vibration sensor and said ambient sound sampled by said microphone represent a bark from the target dog; and
    a stimulus delivery device responsive to said processing device, said stimulus delivery device carried by said enclosure for delivering a corrective stimulus to the target dog upon determination that both said vibration and said ambient sound are indicative of a bark from the target dog.

2. The bark control system of claim 1 wherein said microphone operates continuously and independently from said vibration sensor.

3. The bark control system of claim 1 wherein said microphone is activated when said vibration sensor detects a vibration.

4. The bark control system of claim 1 wherein said processing device is in communication with at least one memory device for storing an exemplary bark for comparison to said ambient sound, said processing device comparing said ambient sound to said exemplary bark and generating a matching result, said matching result indicating whether said ambient sound correlates with said previously stored sample within a predefined tolerance level, wherein said processing device signals said stimulus delivery device to deliver said corrective stimulus to the target dog where said matching result indicates correlation between said ambient sound and said exemplary bark.

5. The bark control system of claim 1 wherein said processing device is in communication with at least one memory device and wherein said identification result indicates a bark from the target dog, said processing device comparing said ambient sound to a previously stored sample and generating a matching result, said matching result indicating whether said ambient sound correlates with said previously stored sample within a predefined tolerance level, wherein said processing device signals said stimulus delivery device to deliver said corrective stimulus to the target dog where said matching result indicates correlation between said ambient sound and said previously stored sample, said ambient sound then being stored in said memory device to replace said previously stored sample, said ambient sound thus becoming said previously stored sample to be compared to a subsequent said ambient sound.

6. The bark control system of claim 1 wherein said processing device and said stimulus delivery circuit are in communication with a stimulus level intensity circuit for varying an intensity level of said corrective stimulus.

7. The bark control system of claim 6 wherein said stimulus level intensity circuit varies said intensity level of said corrective stimulus between a minimum intensity level and a maximum intensity level through a predetermined sequence upon each successive application of said corrective stimulus within a predetermined time period.

8. The bark control system of claim 6 wherein said stimulus level intensity circuit provides multiple intensity levels for said corrective stimulus, selectable by the pet owner.

9. The bark control system of claim 1 wherein said corrective stimulus includes at least one of an electrostatic shock, an ultrasonic pulse, an irritant, a vibration, and an audible deterrent each being offensive to the target dog.

10. A bark control system for training a target dog not to bark, said bark control system comprising:
   an enclosure;
   a mounting device for attaching said enclosure to a target dog;
   a vibration sensor carried by said enclosure for detecting a vibration emitted by the target dog, said vibration sensor operating continuously;
   a microphone carried by said enclosure for sampling an ambient sound, said microphone operating continuously and independently of said vibration sensor;
   a processing device carried by said enclosure for generating an identification result indicating whether said vibration detected by said vibration sensor and said ambient sound sampled by said microphone represents a bark from the target dog;
   a stimulus delivery device responsive to said processing device, said stimulus delivery device carried by said enclosure for delivering a corrective stimulus to the target dog, said corrective stimulus including at least one of an electrostatic shock, an ultrasonic pulse, an irritant, a vibration, and an audible deterrent each being offensive to the target dog; and
   a stimulus level intensity circuit in communication with said processing device and said stimulus delivery device for varying an intensity level of said corrective stimulus.

11. The bark control system of claim 10 wherein said processing device is in communication with at least one memory device for storing an exemplary bark for comparison to said ambient sound, said processing device comparing said ambient sound to said exemplary bark and generating a matching result, said matching result indicating whether said ambient sound correlates with said previously stored sample within a predefined tolerance level, wherein said processing device signals said stimulus delivery device to deliver said corrective stimulus to the target dog where said matching result indicates correlation between said ambient sound and said exemplary bark.

12. The bark control system of claim 10 wherein said processing device is in communication with at least one memory device and wherein said identification result indicates a bark from the target dog, said processing device comparing said ambient sound to a previously stored sample and generating a matching result, said matching result indicating whether said ambient sound correlates with said previously stored sample within a predefined tolerance level, wherein said processing device signals said stimulus delivery device to deliver said corrective stimulus to the target dog where said matching result indicates correlation between said ambient sound and said previously stored sample, said ambient sound then being stored in said memory device to replace said previously stored sample, said ambient sound thus becoming said previously stored sample to be compared to a subsequent said ambient sound.

13. The bark control system of claim 10 wherein said stimulus level intensity circuit varies said intensity level of said corrective stimulus between a minimum intensity level and a maximum intensity level through a predetermined sequence upon each successive application of said corrective stimulus within a predetermined time period.

14. The bark control system of claim 10 wherein said stimulus level intensity circuit provides multiple intensity levels for said corrective stimulus, selectable by the pet owner.

15. A bark control system for training a target dog not to bark, said bark control system comprising:
   an enclosure;
   a mounting device for attaching said enclosure to a target dog;
   a vibration sensor carried by said enclosure for detecting a vibration emitted by the target dog, said vibration sensor operating continuously;
   a microphone carried by said enclosure for sampling an ambient sound, said microphone being activated when said vibration sensor detects a vibration;
   a processing device carried by said enclosure for generating an identification result indicating whether said vibration detected by said vibration sensor and said ambient sound sampled by said microphone represents a bark from the target dog;
   a stimulus delivery device responsive to said processing device, said stimulus delivery device carried by said enclosure for delivering a corrective stimulus to the target dog, said corrective stimulus including at least one of an electrostatic shock, an ultrasonic pulse, an irritant, a vibration, and an audible deterrent each being offensive to the target dog; and
   a stimulus level intensity circuit in communication with said processing device and said stimulus delivery device for varying an intensity level of said corrective stimulus.

16. The bark control system of claim 15 wherein said processing device is in communication with at least one memory device for storing an exemplary bark for comparison to said ambient sound, said processing device comparing said ambient sound to said exemplary bark and generating a matching result, said matching result indicating whether said ambient sound correlates with said previously stored sample within a predefined tolerance level, wherein said processing device signals said stimulus delivery device to deliver said corrective stimulus to the target dog where said matching result indicates correlation between said ambient sound and said exemplary bark.

17. The bark control system of claim 15 wherein said processing device is in communication with at least one memory device and wherein said identification result indicates a bark from the target dog, said processing device comparing said ambient sound to a previously stored sample and generating a matching result, said matching result indicating whether said ambient sound correlates with said previously stored sample within a predefined tolerance level, wherein said processing device signals said stimulus delivery device to deliver said corrective stimulus to the target dog where said matching result indicates correlation between said ambient sound and said previously stored sample, said ambient sound then being stored in said memory device to replace said previously stored sample, said ambient sound thus becoming said previously stored sample to be compared to a subsequent said ambient sound.

18. The bark control system of claim 15 wherein said stimulus level intensity circuit varies said intensity level of said corrective stimulus between a minimum intensity level and a maximum intensity level through a predetermined sequence upon each successive application of said corrective stimulus within a predetermined time period.

19. The bark control system of claim 15 wherein said stimulus level intensity circuit provides multiple intensity levels for said corrective stimulus, selectable by the pet owner.

20. A bark control system for training a target dog not to bark, said bark control system comprising:

an enclosure;

a mounting device for attaching said enclosure to a target dog;

a vibration sensor carried by said enclosure for detecting a vibration emitted by the target dog, said vibration sensor operating continuously;

a microphone carried by said enclosure for sampling an ambient sound, said microphone being activated when said vibration sensor detects a vibration;

a processing device carried by said enclosure for generating an identification result indicating whether said vibration detected by said vibration sensor and said ambient sound sampled by said microphone represents a bark from the target dog;

a stimulus delivery device responsive to said processing device, said stimulus delivery device carried by said enclosure for delivering a corrective stimulus to the target dog, said corrective stimulus including at least one of an electrostatic shock, an ultrasonic pulse, an irritant, a vibration, and an audible deterrent each being offensive to the target dog;

at least one memory device in communication with said processing device, wherein said identification result indicates a bark from the target dog, said processing device comparing said ambient sound to a previously stored sample and generating a matching result, said matching result indicating whether said ambient sound correlates with said previously stored sample within a predefined tolerance level, wherein said processing device signals said stimulus delivery device to deliver said corrective stimulus to the target dog where said matching result indicates correlation between said ambient sound and said previously stored sample, said ambient sound then being stored in said memory device to replace said previously stored sample, said ambient sound thus becoming said previously stored sample to be compared to a subsequent said ambient sound; and a stimulus level intensity circuit in communication with said processing device and said stimulus delivery device for varying an intensity level of said corrective stimulus, said stimulus level intensity circuit varying said intensity level of said corrective stimulus between a minimum intensity level and a maximum intensity level through a predetermined sequence upon each successive application of said corrective stimulus within a predetermined time period.

* * * * *